United States Patent [19]

Kawasaki et al.

[11] 4,180,310
[45] * Dec. 25, 1979

[54] PHOTOMETRIC CIRCUIT

[75] Inventors: Masahiro Kawasaki; Yoshio Sawada, both of Tokyo, Japan

[73] Assignee: Asahi Kogaku Kogyo Kabushiki Kaisha, Tokyo, Japan

[*] Notice: The portion of the term of this patent subsequent to Aug. 8, 1995, has been disclaimed.

[21] Appl. No.: 887,914

[22] Filed: Mar. 17, 1978

Related U.S. Application Data

[63] Continuation of Ser. No. 679,587, Apr. 23, 1976, Pat. No. 4,106,035.

[30] Foreign Application Priority Data

Apr. 25, 1975 [JP] Japan .................................. 50-50470

[51] Int. Cl.$^2$ .............................................. G03B 7/08
[52] U.S. Cl. ...................................... 354/24; 354/51; 354/60 R
[58] Field of Search .................. 354/50, 51, 60 R, 24; 356/218, 226

[56] References Cited

U.S. PATENT DOCUMENTS

| | | | |
|---|---|---|---|
| 3,781,551 | 12/1973 | Mori | 354/50 X |
| 3,952,318 | 4/1976 | Mori et al. | 354/60 R X |

Primary Examiner—Michael L. Gellner
Attorney, Agent, or Firm—Sughrue, Rothwell, Mion, Zinn and Macpeak

[57] ABSTRACT

A novel photometric circuit for a camera is disclosed wherein the operational amplifiers common to conventional photometric circuits are eliminated from that part of the circuit which solves the exposure Apex indication equation: $S_v + B_v = A_v + T_v$. The variable resistors which are used to convert the film sensitivity and aperature settings into electrical quantities are positioned in the feedback circuit of the transistor which is connected to the electro-optical transducer and which develops a voltage dependent upon scene brightness.

3 Claims, 4 Drawing Figures

U.S. Patent
Dec. 25, 1979
4,180,310
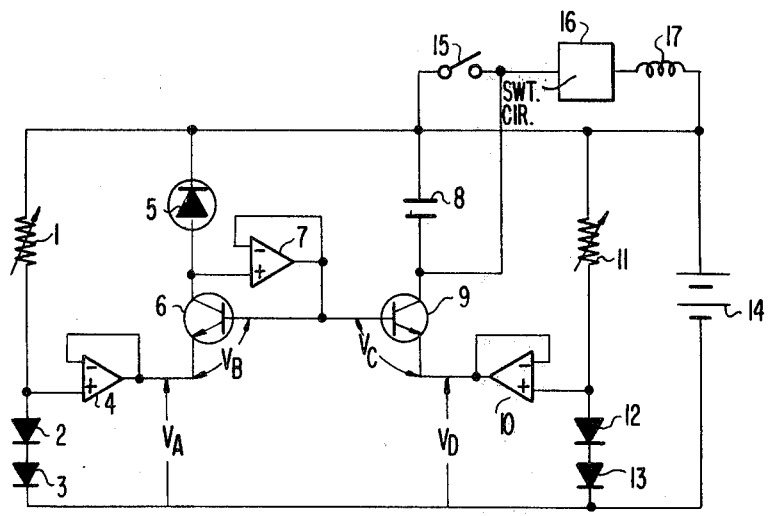
FIG.1
PRIOR ART
FIG.2
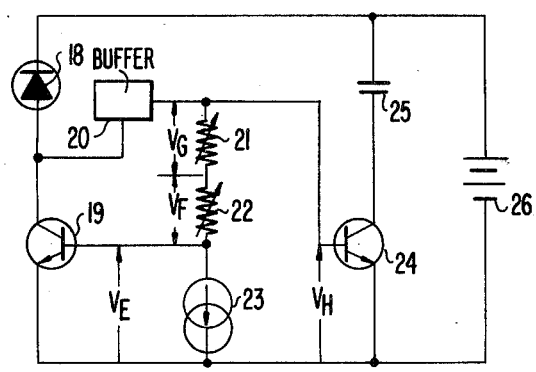
FIG.4
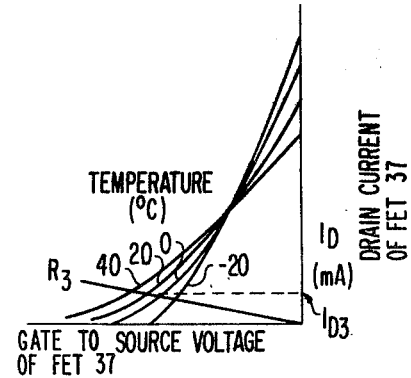
FIG.3
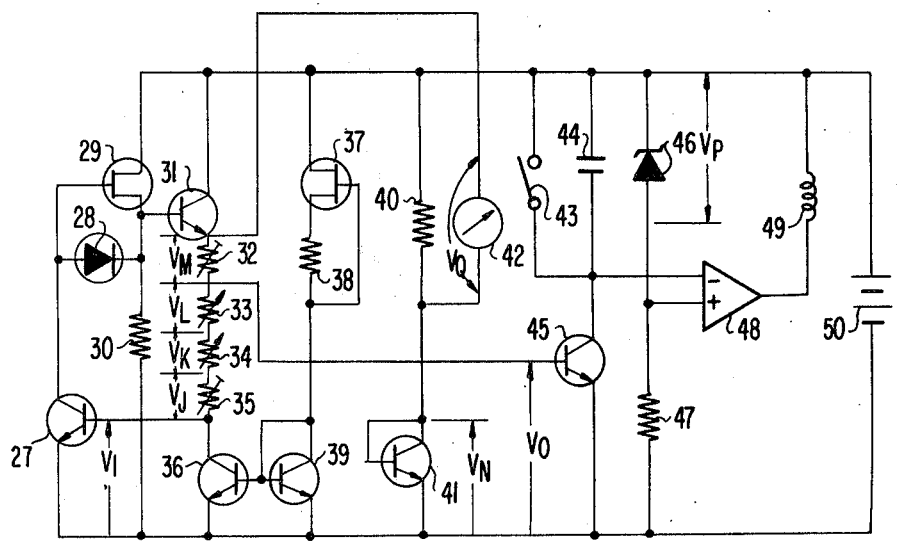

PHOTOMETRIC CIRCUIT

This is a continuation of application Ser. No. 679,587, filed Apr. 23, 1976, now U.S. Pat. No. 4,106,035.

BACKGROUND OF THE INVENTION

The present invention is in the field of photometric circuits for cameras and the like.

It is well known in the art to provide photometric circuits in cameras or the like for determining the required film exposure time depending upon the conditions of film speed, lens aperature setting and scene brightness. The determination is made in a circuit which electronically calculates the Apex indication value Tv according to the Apex indication formula:

$$S_v + B_v = T_v + A_v,$$

where $S_v$, $B_v$, and $A_v$ are the Apex indication values for film sensitivity, scene brightness, and lens aperature opening, respectively.

The conventional photometric circuit utilizes a plurality of operational amplifiers and precision wide range variable resistors. This causes several drawbacks which will be explained in greater detail below. An example of a conventional photometric circuit is shown in FIG. 1.

In the circuit of FIG. 1, a variable resistor 1, which can be set in accordance with the film sensitivity, and diodes 2 and 3 are connected in series with an electric power source 14. The junction of variable resistor 1 and diode 2 is connected to the input of an operational amplifier 4 constituting a voltage-follower circuit. Another variable resistor 11, which can be set in accordance with the aperture setting, and diodes 12 and 13 are also connected in series with the electric power source 14. The junction of variable resistor 11 and diode 12 is connected to an input of another operational amplifier 10 constituting a voltage-follower circuit. A photoelectric element 5, adapted to receive light from the scene, is connected to the collector of a transistor 6 having an emitter connected with the output of the operational amplifier 4. A high input resistance operational amplifier 7, constituting a voltage-follower circuit, is connected between the collector and base of transistor 6, thereby forming a feedback circuit. An integrating capacitor 8 is connected to the collector of another transistor 9 having a base connected to the base of the transistor 6. The emitter of transistor 6 is connected with the output of the operational amplifier 10.

The operation of the above described circuit is well known. The values of the currents and voltages are such that the voltages $V_B$, $V_A$, and $V_D$ correspond directly to the apex-indicative values $B_v$, $S_v$, and $A_v$ of the brightness B of the object, the sensitivity S of the film, and the aperture A of the lens, respectively. Therefore $V_C$, which satisfies the circuit equation:

$$V_C = V_B + (V_A - V_D) \quad (1)$$

is equal to a voltage corresponding to $B_v + S_v - A_v$, that is, corresponding to an apex-indicative value $T_v$ of the exposure T. Because of the base-emitter voltage versus collector current characteristic of transistor 9, the collector current of the transistor is inversely proportional to the exposure time T. When a timing switch 15 of the camera is opened, the integrating capacitor 8 begins to charge and current flows through a coil 17 of an electromagnet. When the voltage across capacitor 8 exceeds the threshold voltage of a switching circuit 16, the energization of the electromagnet coil 17 is terminated. The time period starting from the opening of the timing switch 15 to the termination of the energization of the coil 17 is thus proportional to the value T calculated as described above, and constitutes the exposure period of the camera.

However, the aforesaid photometric circuit has drawbacks as follows.

(1) The composition of the operational amplifiers is complicated and the cost of the circuit is therefor high.

(2) Because of the threshold voltages of the operational amplifiers and the transistors, a relatively high voltage power source must be used.

(3) Because of the operational amplifiers and the variable resistors 1 and 11, the current consumption of the circuit is high.

(4) Because of the wide varying ranges of the variable resistors, corresponding to the aperture of the lens and the sensitivity of the film, the production of the variable resistors is difficult.

SUMMARY OF THE INVENTION

According to the present invention, the above described difficulties of the conventional circuit can be eliminated.

The photometric circuit of the present invention eliminates operational amplifiers in the calculation part of the circuit and operates on a different principle. The variable resistors provided to convert film speed and aperature settings into electrical quantities are provided in the feedback circuit of a log compression transistor that has its collector fed by current from the optical transducer that senses scene brightness. A constant current source is connected to the variable resistors and the current value is selected so that the voltages thereacross represent the apex indication values for the film sensitivity and aperature settings. A log expansion transistor has its base and emitter connected in a circuit loop with the base-emitter of the log compression transistor and the variable resistors. The base-to-emitter voltage of the log expansion transistor is thus dependent upon the apex indication value $T_v$ of the exposure time.

BRIEF DESCRIPTION OF DRAWINGS

FIG. 1 is a circuit diagram showing a conventional photometric circuit.

FIG. 2 is a circuit diagram for explaining the basic principle of the present invention.

FIG. 3 is a circuit diagram showing a practical example of the photometric circuit according to this invention.

FIG. 4 is a graphical representation of the characteristics of an FET.

DETAILED DESCRIPTION OF THE INVENTION

The fundamental principle of the invention will now be described with reference to FIG. 2. The collector of a log compression transistor 19, which is connected to a photoelectric element 18, is feedback connected through a buffer circuit 20 and variable resistors 21 and 22 to the base of the same transistor 19. A current from a constant current source 23 flows through the variable resistors 21 and 22. The output of the buffer circuit 20 is further connected to the base of a log expansion transistor 24 whose collector is connected with an integrating capacitor 25. Numeral 26 designates a constant voltage source.

The operation of the above described circuit according to this invention is as follows. Since the collector of the compression transistor 19 receiving a light-responsive current $i_p'$ from the reverse biased photoelectric element 18 is feedback connected to the base of the same transistor, the base-to-emitter voltage $V_E$ of the transistor has a value dependent on the current $i_p'$. That is, $$V_E = \frac{KT}{q} \log \frac{i_p'}{i_o} + V_{BE(io)} \qquad (2)$$

where, q: electric charge of an electrode,
K: Boltzmann's constant,
T: absolute temperature,
$V_{BE(io)}$: base-to-emitter voltage of the transistor 19 at the time of the collector current being $i_o$. The relation between the light-responsive current $i_p'$ and the apex indicative value $B_v$ of the brightness B of an object to be photographed is expressed as $$i_p' = i_{PO} 2^{B_v} \qquad (3)$$

where, $i_{PO}$ is light-responsive current at the time of $B_v = O$.

Thus, the base-emitter voltage of the compression transistor 19 can be expressed, $$V_E = \frac{KT}{q} \log \frac{i_{PO}}{i_o} 2^{B_v} + V_{BE(io)} \qquad (4)$$

The variable resistor 21 is selected to be related to the apex indicative value $S_v$ of the sensitivity S of the film, and the variable resistor 22 is selected to be related to the apex indicative value $A_v$ of the aperture A of the lens. Thus, assuming that the resistances of the variable resistors 21 and 22 are $R_1$ and $R_2$, they can be expressed by the following equations:

$$R_1 = R_S \cdot S_v \qquad (5)$$

$$R_2 = R_S \cdot (N - A_v) \qquad (6)$$

where, $R_S$ is a resistance value corresponding to one step of $S_v$ and $A_v$, and K is a constant.

The current value $i_S$ from the constant current source 23 is set as follows, $$i_S = (KT/q) \cdot (1/R_S) \cdot \log 2 \qquad (7)$$

Therefore, the voltages $V_G$ and $V_F$ appearing across the variable resistors 21 and 22 are expressed, $$V_G = KT/q \cdot S_v \cdot \log 2 \qquad (8)$$

$$V_F = KT/q \cdot (N - A_v) \cdot \log 2 \qquad (9)$$

On the other hand, the relation between the base-emitter voltage $V_H$ of the log expansion transistor 24 and the collector current $i_C$ of the same (in the case where the base-emitter voltage versus collector current characteristic of the expansion transistor 24 is assumed to be equal to the same characteristic of the compression transistor 19) can be expressed as, $$V_H = \frac{KT}{q} \log \frac{i_C}{i_O} + V_{BE(iO)} \qquad (10)$$

The relation between the apex-indicative value $T_v$ of the exposure time T and the collector current $i_C$ of the expansion transistor 24 is indicated by the following equation:

$$i_C = i_{CO} 2^{T_v} \qquad (11)$$

where, $i_{CO}$ is the collector current of the expansion transistor at $T_v = O$. Thus, the base-to-emitter voltage $V_H$ of the expansion transistor 24 can be expressed, $$V_H = \frac{KT}{q} \log \frac{i_{CO}}{i_O} \cdot 2^{T_v} + V_{BE(iO)} \qquad (12)$$

On the other hand, using the base-to-emitter voltage $V_E$ of the compression transistor 19, and the terminal voltages $V_G$ and $V_F$ of the variable resistors 21 and 22, the base-to emitter voltage $V_H$ of the expansion transistor 24 can be expressed as, $$V_H = V_E + V_F + V_G \qquad (13)$$

Substituting equations (4), (8), (9), and (12) in Eq. (13) the following equation can be obtained, $$(B_v + S_v - A_v - T_v) = \frac{1}{\log 2} (\log \frac{i_{CO}}{i_{PO} 2^N}) \qquad (14)$$

In order to allow an apex operation of $T_v = B_v + S_v - A_v$, the following relationship must exist:

$$i_{CO} = i_{PO} 2^N \qquad (15)$$

Thus, the theoretically correct operation of the photometric circuit according to the present invention can be achieved by finding a value of N satisfying the equation (15).

A practical example of the present invention will now be described with reference to FIG. 3. A feedback connection is provided from the collector of log compression transistor 27 to the base thereof through a source follower circuit, formed by an FET 29 and a resistor 30, a transistor 31, whose emitter is energized by a transistor 36 constituting a constant current source, and variable resistors 32 through 35 connected to the emitter. A photoelectric element 28 is connected between the collector of transistor 27 and the source electrode of FET 29. Variable resistor 32 is provided for adjusting an indication on a meter 42, variable resistor 33 is set in accordance with the sensitivity of the film, variable resistor 34 is set in accordance with the aperture of the lens, and variable resistor 35 is used for adjusting the exposure time. The base of the transistor 36 is connected with the base of a transistor 39, which is connected to form a diode. The collector and base of transistor 39 are connected to the gate of an FET 37, and a self-biasing resistor 38 is connected between the gate and source electrode of the FET thereto.

The meter 42 is connected between the junction of a resistor 40 and another diode connected transistor 41, and the emitter of the transistor 31. The resistor 40 and transistor 41 are series connected across a power source 50. The junction between the variable resistors 32 and 33 is connected to the base of a log expansion transistor 45, and the collector of transistor 45 is connected to a timing switch 43, a capacitor 44, and an inverting input terminal of a comparator 48. The junction between a zener diode 46 and a resistor 47, both connected in series across the power source 50, is connected with the non-inverting input terminal of the comparator 48. The output of the latter is connected to a coil 49 of an electromagnet.

In operation, the voltage $V_I$ between the base and emitter of the transistor 27 is at a value, as will be apparent from FIG. 2, dependent upon the light-responsive current in the photoelectric element 28. The collector current of transistor 36 (constant current) must be set at, $$i_S = (KT/q) \cdot (1/R'_S) \cdot \log 2 \quad (7)$$

as explained above. This is accomplished by the connections provided in FIG. 3. If transistors 36 and 39 have the same characteristics, the collector current $i_S$ of transistor 36 would become constant current equal to the drain current of FET 37, i.e., the collector current $i_D$ of transistor 39, because both transistors 36 and 39 must have the same base-to-emitter voltage. The current $i_D$ can be controlled so as to be proportional to the absolute temperature T, as required by equation (7), by properly selecting the FET 37 and resistor 38. The gate-to-source voltage $V_{GS}$ versus drain current $I_D$ characteristics of the self-biased FET 37 are shown in FIG. 4. Assuming the resistance value of the resistor 38 is $R_3$ and finding in FIG. 4 the intersecting point between a load curve thereby formed and a characteristic curve at 20° C. of the FET 37, the drain current $I_{D3}$ of the FET 37 under desired conditions can be obtained. As indicated in equation (7), it is required that the drain current of the FET 37 have a temperature characteristic proportional to the absolute temperature T. As will be apparent from FIG. 4, such a requirement can be easily satisfied by changing the value $R_3$ and by selecting the characteristic of the FET suitably. Thus, by the use of two transistors 36 and 39 having an equal base-to-emitter voltage versus collector current characteristics, a constant current source providing a current equal to the drain current $I_{D3}$ of the FET 37 can be formed at the collector of the transistor 36.

The terminal voltages $V_L$ and $V_K$ are obtained across the variable resistors 33 and 34 which can be set in accordance with the sensitivity of film and the aperature of lens, respectively. The variable resistor 35 which can be set in accordance with the exposure time is adjusted thereby to obtain N satisfying the equation (15). When all the above described conditions are satisfied, the collector current of the expansion transistor 45 realizes the right exposure of the camera.

The magnet 49 is energized while the timing switch 43 closes, and when the timing switch 43 is opened, the capacitor 44 is charged until the charged voltage reaches the terminal voltage $V_P$ of the zener diode 46. Upon reaching the terminal voltage $V_P$, the energization of the magnet 49 is terminated. The detailed description of the relation between the timing switch and the magnet in the camera is omitted because it is well known in the art.

The terminal voltage $V_Q$ across the meter 42, connected between the collector of the transistor 41 and the emitter of the transistor 31 is expressed as $$V_Q = V_O + V_M - V_N \quad (16)$$

In the equation (16), since $V_O$ is proportional to the apex-indicative value $T_v$ of the exposure time T, the meter terminal voltage $V_Q$ is in proportion to $T_v$. The level of the meter 42 can be arbitrarily adjusted by the voltage $V_m$ generated across the meter adjusting variable resistor 32.

As will be apparent from the above description, the photometric circuit composition can be extremely simplified by the present invention, and a substantial reduction in the cost of production of such circuits can be realized. The circuit can be operated at a lower voltage with a lower power consumption and has a good temperature characteristic and a good reduced-voltage characteristic. Furthermore, in production stage, the circuit exhibits further advantageous features since the adjusting and variable resistors of the circuit can be located in a single area.

What is claimed is:

1. A photometric circuit for electronically determining proper exposure time based on scene brightness, film sensitivity and aperture settings, said circuit being of the type having a photoelectric transducer for developing a current dependent upon scene brightness, a first transistor having its collector connected to said photoelectric transducer and its base connected to its collector by a high input impedance collector-to-base feedback circuit for developing a base-to-emitter voltage related to the apex indication value $B_v$ of the brightness B of the scene, a pair of variable resistors for setting the film speed and aperture values into the circuit, respectively, and a second transistor for developing an exposure control current at its collector in dependance upon the voltage applied between its base and emitter, the improvement comprising, said variable resistors being connected in series with each other and in the feedback circuit between collector and base of the first transistor, constant current source means connected to said series connection of said variable resistors for providing a constant current to said variable resistors having a value which causes the voltage across said resistors to be related to the apex indication values $S_v$ and $A_v$, respectively, and said second transistor having its base-emitter circuit connected in a circuit loop with said variable resistors and said base-emitter circuit of said first transistor.

2. A photometric and operational circuit as set forth in claim 1 wherein said constant current source means provides a current having a value such that the temperature characteristics of the voltages thereby created across the variable resistors per one step of the exposure determining factors, respectively, substantially satisy $(KT/q) \log_e 2$ (wherein K is Boltzmann's constant, q is the electric charge of an electron, and T is an absolute temperature).

3. A photometric circuit as claimed in claim 2 wherein said constant current source means comprises, a third transistor having its collector connected to said series connected variable resistors, its emitter connected to a source of reference potential, and means for providing a voltage dependant upon the absolute temperature connected to its base.

* * * * *